United States Patent [19]

Shiraishi et al.

[11] Patent Number: 5,161,106
[45] Date of Patent: Nov. 3, 1992

[54] VEHICLE DYNAMIC CHARACTERISTIC CONTROL APPARATUS

[75] Inventors: Yasuhiro Shiraishi, Atsugi; Yasuki Ishikawa, Sagamihara, both of Japan

[73] Assignee: Nissan Motor Company, Limited, Yokohama, Japan

[21] Appl. No.: 519,225

[22] Filed: May 3, 1990

[30] Foreign Application Priority Data

May 16, 1989 [JP] Japan .................... 1-122060

[51] Int. Cl.$^5$ .............................. B62D 5/00
[52] U.S. Cl. ..................... 364/424.05; 364/424.03; 180/142; 180/79.1
[58] Field of Search ............... 364/424.03, 424.04, 364/424.05; 307/10.1, 10.7; 371/14, 16.3; 180/79.1, 140–143; 340/438, 465

[56] References Cited

U.S. PATENT DOCUMENTS

| | | | |
|---|---|---|---|
| 3,749,897 | 7/1973 | Hirvela | 371/16.3 |
| 4,726,024 | 2/1988 | Guziak et al. | 371/16.3 |
| 4,939,654 | 7/1990 | Kouda et al. | 180/142 |
| 4,961,144 | 10/1990 | Yabe et al. | 180/79.1 |

Primary Examiner—Gary Chin
Attorney, Agent, or Firm—Foley & Lardner

[57] ABSTRACT

A vehicle dynamic characteristic control apparatus for use with a motor vehicle having a controllable dynamic characteristic. The apparatus includes an actuator for controlling the dynamic characteristic of the motor vehicle, and a control unit for calculating a value for a setting of the actuator based on vehicle running conditions and converting the calculated value into a setting of the actuator. The control unit produces a start command when it receives an abnormal signal which does not occur during normal vehicle driving. An electric signal is produced to operate the actuator in a self-checking mode in the presence of the start command. The self-checking operation is terminated when a time has elapsed after the start command is produced. This is effective to avoid troubles which will occur if the self-checking operation continues for a long time.

3 Claims, 7 Drawing Sheets

VEHICLE DYNAMIC CHARACTERISTIC CONTROL APPARATUS

BACKGROUND OF THE INVENTION

This invention relates to a vehicle dynamic characteristic control apparatus for use with a motor vehicle having controllable dynamic characteristics including yaw velocity, side velocity, roll velocity, etc. Although the invention will be described in connection with a rear wheel steering control system, it should be understood that the invention is equally applicable to other vehicle dynamic characteristic control systems including active suspension control systems and the like utilizing information on steering wheel position to control the dynamic characteristics of motor vehicles.

For example, U.S. patent application Ser. No. 07/284,414, filed Dec. 14, 1988, now abandoned, discloses a rear wheel steering control system for controlling the angle of steering of the rear wheels based on a rear wheel steering angle calculated as a function of vehicle speed and front wheel steering angle. For the purpose of calculating the front wheel steering angle, which corresponds to a deviation of the existing steering wheel position from a steering wheel neutral position indicating a driver's demand for straight ahead driving, the rear wheel steering control system includes a steering wheel position sensor for sensing the existing steering wheel position and a steering wheel neutral position sensor for producing a steering wheel neutral position signal having a first level when the steering wheel position is within a predetermined range and a second level when the steering wheel position is out of the predetermined range. The rear wheel steering control system estimates the steering wheel neutral position by calculating an average value of the steering wheel position sensed when the steering wheel neutral position signal changes from the second level to the first level and the steering wheel position sensed when the steering wheel neutral position signal changes from the first level to the second level. This estimation is made immediately when the rear wheel steering control system is powered on.

The rear wheel steering control system also has a self-checking function of producing an electric signal to operate the rear wheel steering actuator in a self-checking mode. The self-checking operation is initiated in response to an input signal which may not occur during normal vehicle driving. However, no means has been provided for limiting the interval of time of the self-checking operation. For this reason, the steering actuator will be damaged due to a working fluid temperature increase (in the case of a hydraulic actuator used for the steering actuator) or the engine cannot start due to car battery overdischarge (in the case of an electric actuator used for the steering actuator) if the self-checking operation continues for a long time.

SUMMARY OF THE INVENTION

Therefore, it is a main object of the invention to provide an improved vehicle dynamic characteristic control apparatus which can perform a self-checking operation without troubles including actuator durability reduction, car battery overdischarge and the like.

There is provided, in accordance with the invention, a vehicle dynamic characteristic control apparatus for use with a motor vehicle having a controllable dynamic characteristic. The apparatus comprises sensor means sensitive to vehicle running conditions for producing sensor signals indicative of sensed vehicle running conditions, and actuator means for controlling the dynamic characteristic of the motor vehicle. A control unit is coupled between the sensor means and the actuator means. The control unit includes means for determining a value for a setting of the actuator means based on the sensor signals, means for converting the determining value into a setting of the actuator means, means for producing a start command when at least selected one of the sensor signals is abnormal, means responsive to the start command for producing an electric signal to operate the actuator means in a self-checking mode, means for producing a termination command when a time has elapsed after the start command is produced, and means responsive to the termination command for terminating the self-checking mode of operation of the actuator means.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
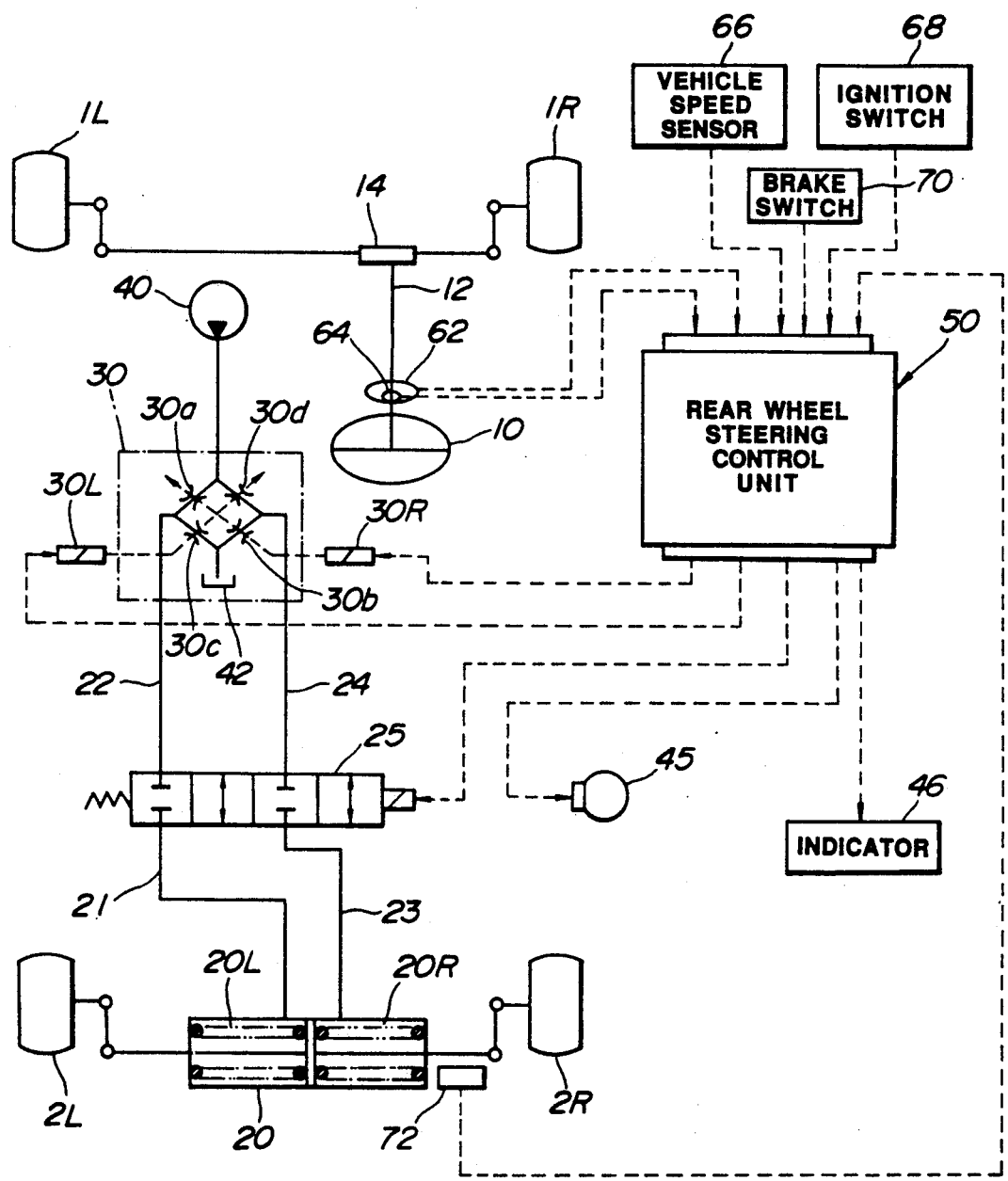
FIG. 1 is a schematic diagram of a vehicle dynamic characteristic control apparatus embodying the invention.

With reference to the drawings, and in particular to FIG. 1, there is shown a schematic diagram of a steering control system embodying the invention. The steering control system will be described in connection with a four wheel steering type automotive vehicle supported on a pair of steerable front wheels 1L and 1R spaced laterally apart at equal distances from a vehicle longitudinal axis and a pair of steerable rear wheels 2L and 2R spaced laterally apart at equal distances from the vehicle longitudinal axis.

The front wheels 1L and 1R are connected to a steering wheel or handle 10 through a conventional link mechanism including a steering shaft 12 and a steering gear 14. The rear wheels 2L and 2R are associated with a steering actuator 20 of the spring center type having two pressure chambers 20L and 20R for turning the rear wheels 2L and 2R in response to the hydraulic pressure acting in the first or second pressure chamber 20L or 20R. The steering actuator 20 turns the rear wheels 2L and 2R in a counter-clockwise direction at an angle proportional to the hydraulic pressure introduced into the first pressure chamber 20L with respect to the vehicle longitudinal axis and it turns the rear wheels 2L and 2R in the clockwise direction at an angle proportional to the pressure introduced into the second pressure chamber 20R with respect to the vehicle longitudinal axis. The first pressure chamber 20L is connected through a conduit 21 to a cutoff solenoid valve 25 and hence through a conduit 22 to a control valve 30. The second pressure chamber 20R is connected through a conduit 23 to the cutoff solenoid valve 25 and hence through a conduit 24 to the control valve 30.

The cutoff valve 25 is normally in a closed position cutting off communication between the lines 21 and 22 and at the same time cutting off communication between the conduits 23 and 24. The cutoff valve 25 moves to its open position establishing communication between the conduits 21 and 22 and at the same time establishing communication between the lines 23 and 24 in the presence of a drive signal IF in the form of electric current applied thereto from a control unit 50. The control unit 50 interrupts the application of the drive signal IF when the ignition switch (not shown) is turned off or when a trouble occurs in the steering control system.

The control valve 30 has two pairs of variable area orifices connected in a bridge configuration. One pair of orifices 30a and 30b are associated with a solenoid 30R which varies the opening areas of the orifices 30a and 30b as a function of the magnitude of a drive signal IR* in the form of electric current applied thereto from the control unit 50. The orifices 30a and 30b have a maximum opening area in the absence of the drive signal IR*. The other pair of orifices 30c and 30d are associated with a solenoid 30L which varies the opening areas of the orifices 30c and 30d as a function of the magnitude of a drive signal IL* in the form of electric current applied thereto from the control unit 50. The orifices 30c and 30d have a maximum opening area in the adsence of the drive signal IL*. The bridge is driven by a hydraulic source which is obtained from an electric pump 40 having its outlet connected to the bridge for supplying hydraulic fluid to the bridge. Excess hydraulic fluid is discharged from the bridge to a reservoir 42.

In the absence of the drive signals IL* anad IR*, the orifices 30a, 30b, 30c and 30d are open fully to discharge all of the hydraulic pressure from the electric pump 40 to the reservoir 42. As a result, no hydraulic pressure is supplied to the first and second pressure chambers 20L and 20R. The control valve 30 supplies a hydraulic pressure corresponding to the magnitude of the drive signal IL* through the cutoff valve 25 to the first or second pressure chamber 20L or 20R of the steering actuator 20.

The steering angle of the rear wheels 2L and 2R, this being determined by the magnitude of the drive signal IL* or IR* applied to the first or second solenoids 30L or 30R, is repetitively determined from calculations performed by the control unit 50, these calculations being based upon various conditions of the automotive vehicle that are sensed during its operation. These sensed conditions include steering wheel position, steering wheel rotating direction, steering wheel neutral position, and vehicle speed. Thus, a steering wheel position sensor 62, a steering wheel neutral position sensor 64 and a vehicle speed sensor 66 are connected to the control unit 50. The numeral 68 designates an ignition switch connected to the control unit 50. When the ignition switch 68 is turned on, energy is supplied to the ignition system and to the control unit 50. The numeral 70 designates a brake switch connected to the control unit 50. The brake switch 70 produces a brake switch signal BS having a high level upon the application of braking to the vehicle. The numeral 72 designates a rear wheel steering angle sensor connected to the control unit 50. The rear wheel steering angle sensor 72 produces a rear wheel steering angle signal indicative of an actual valve of the steering angle of the rear wheels 2L and 2R.

Figure 2:
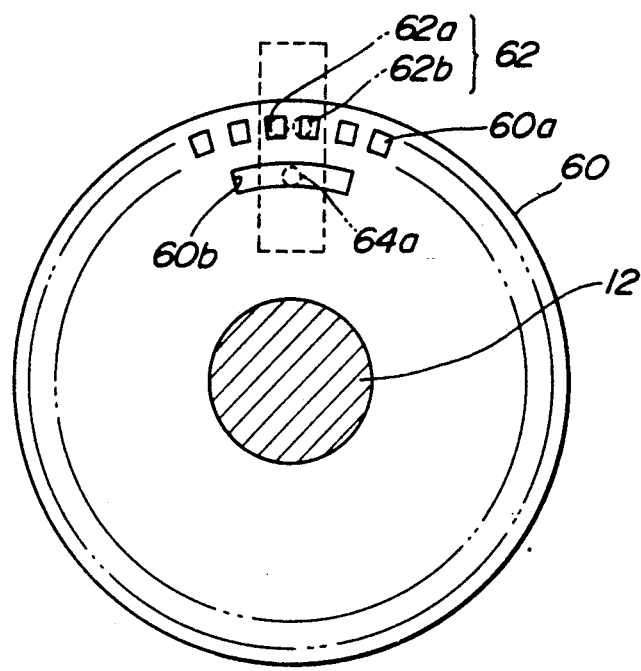
FIG. 2 is a plan view used in explaining the steering wheel position sensor and steering wheel neutral position sensor used in the control apparatus.

Referring to FIG. 2, the numeral 60 designates a sensor disc mounted for rotation in unison with the steering shaft 12 secured at its one end to the steering wheel 10. The sensor disc 60 is formed therein with a number of openings 60a and a slit 60b. The openings 60a, which are equally spaced circumferentially at several degrees of rotation of the sensor disc 60, are formed over the entire 360° of rotation of the sensor disc 60. The slit 60b extends circumferentially through a predetermined number of degrees of rotation of the sensor disc 60 to determine a steering wheel neutral position range.

Figure 3:
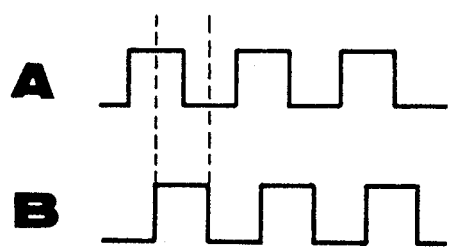
FIG. 3 is a voltage waveform timing diagram illustrating a difference between the phases of the steering wheel position signals produced from the steering wheel position sensor when the steering wheel rotates in a first direction.
Figure 4:
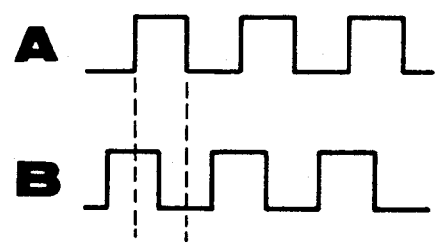
FIG. 4 is a voltage waveform timing diagram illustrating a difference between the phases of the steering wheel position signals produced from the steering wheel position sensor when the steering wheel rotates in a second, opposite direction.

The steering wheel position sensor 62 comprises two light emission diodes 62a and 62b and two light sensor elements (not shown) facing to the respective light emission diodes 62a and 62b. The light emission diodes 62a and 62b are located on one side of the sensor disc 60 and the corresponding light sensor elements are located on the opposite side of the sensor disc 60. The light emission diode 62a emits light to the corresponding light sensor element which produces a steering wheel position signal having a high level upon the receipt of the light emitted from the light emission diode 62a through one of the openings 60a and a low level when the sensor disc 60 interrupts the path of the light emitted from the light emission diode 62a, as shown by the waveforms A of FIGS. 3 and 4. The number of pulses of this steering wheel position signal corresponds to the steering wheel position in the form of the degrees of rotation of the steering wheel 10 from a reference position. Similarly, the light emission diode 62b emits light to the corresponding light sensor element which produces a steering wheel position signal having a high level upon the receipt of the light emitted from the light emission diode 62b through one of the openings 60a and a low level when the sensor disc 60 interrupts the path of the light emitted from the light emission diode 62b, as shown by the waveforms B of FIGS. 3 and 4. The number of pulses of this steering wheel position signal corresponds to the steering wheel position in the form of the degrees of rotation of the steering wheel 10 from a reference position. The light emission diodes 62a and 62b are spaced apart from each other at a distance equal to one-half of the pitch of the openings 60a so that a phase shift occurs between the steering wheel position signals in one direction (FIG. 3) upon rotation of the steering wheel 10 in a clockwise direction and in the opposite direction (FIG. 4) upon rotation of the steering wheel 10 in the counter-clockwise direction. Thus, the steering wheel position signals indicate the direction and degree of rotation of the steering wheel 10.

Figure 5:
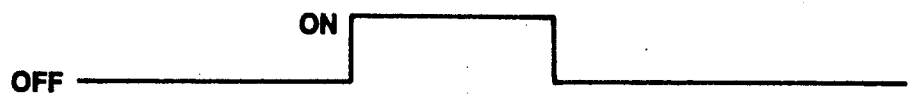
FIG. 5 is a voltage waveform timing diagram illustrating the steering wheel neutral position signal produced from the steering wheel neutral position sensor.

The steering wheel neutral position sensor 64 includes a light emission diode 64a and a light sensor element (not shown) facing to the light emission diode 64a. The light emission diode 64a is located on one side of the sensor disc 60 and the corresponding light sensor element is located on the other side of the sensor disc 60. The light emission diode 64a emits light to the corresponding light sensor element which produces a steering wheel neutral position signal having a high level upon the receipt of the light emitted from the light emission diode 64a through the slit 60b and a low level when the sensor disc 60 interrupts the path of the light emitted from the light emission diode 64a, as shown in FIG. 5. The angle (steering wheel straight ahead driving range) through which the slit 60b extends circumferentially is determined to ensure that the steering wheel neutral position signal is at its high level during straight ahead driving. Considering the assembling errors ($\pm 5°$) and the driver's correction ($\pm 5°$) of steering wheel position, this angle may be set at 20°.

Figure 6:
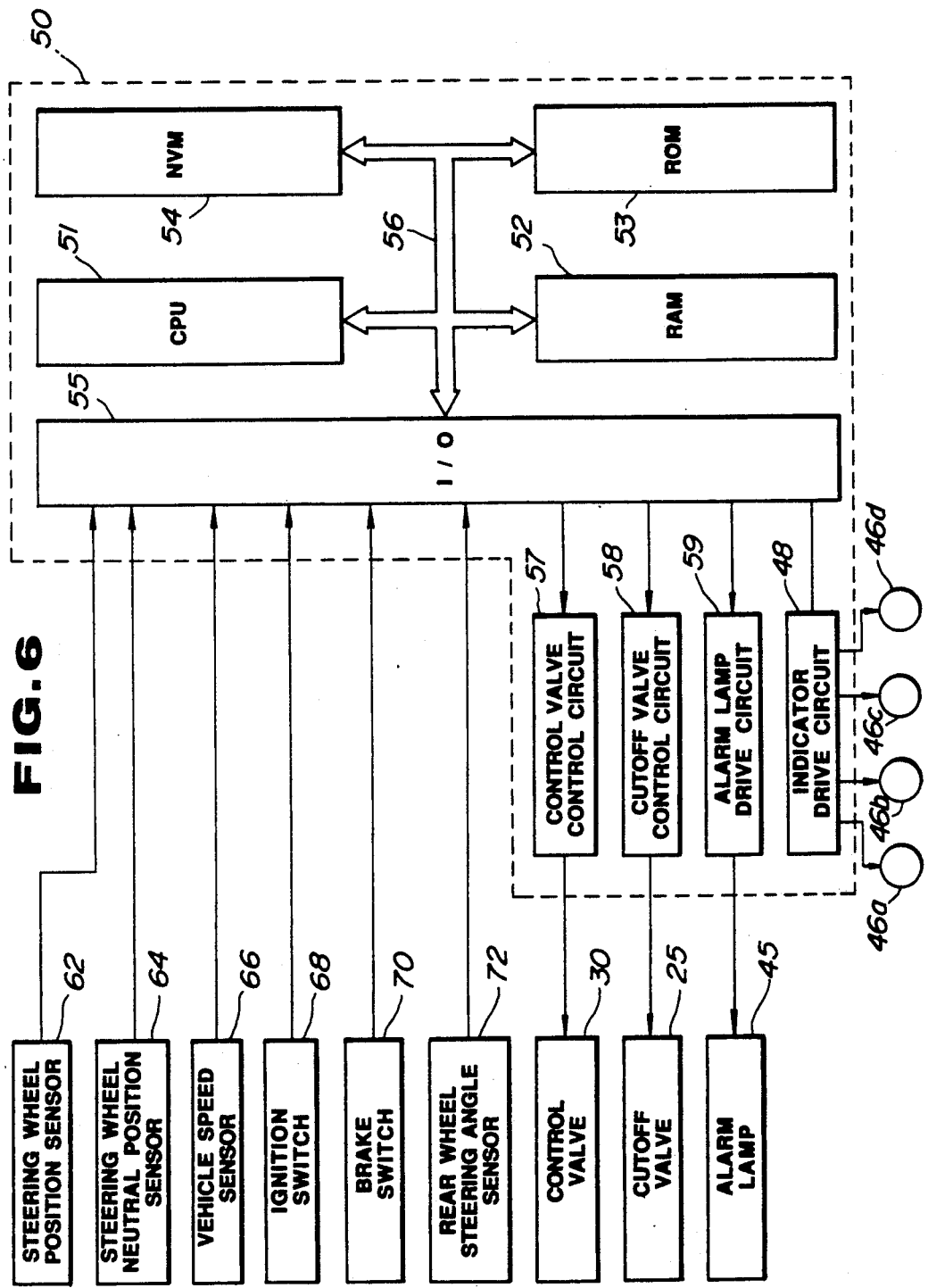
FIG. 6 is a block diagram illustrating the detailed arrangement of the control unit.

Referring to FIG. 6, the control unit 50 employs a digital computer including a central processing unit (CPU) 51, a random access memory (RAM) 52, a read only memory (ROM) 53, a nonvolatile memory (NVM) 54, and an input/output control circuit (I/O) 55. The central processing unit 51 communicates with the rest of the computer via data bus 56. The input/output control circuit 55 includes an analog-to-digital converter, timers and counters. The input/output control unit 55 is connected to the steering wheel position sensor 62, the steering wheel neutral position sensor 64, the vehicle speed sensor 66, the ignition switch 68, the brake switch 70 and the rear wheel steering angle sensor 72 for converting the sensor signals for application to the central processing unit 51. The read only memory 53 contains the programs for operating the central processing unit 51 and further contains appropriate data in look-up tables used in calculating appropriate values for rear wheel steering angle. The look-up table data may be obtained experimentally or derived empirically. Control words specifying a desired rear wheel steering angle are periodically transferred by the central processing unit 52 through the input/output control circuit 55 to a control valve control circuit 53 which converts it into a drive signal IL* or IR* to the control valve 30. When a failure occurs in the steering control system, the central processing unit 51 produces a command which is fed through the input/output control circuit 55 to a cutoff valve control circuit 58 which thereby interrupts the drive signal IF to close the cutoff valve 25 and also another command which is fed through the input/output control circuit 55 to an alarm lamp drive circuit 59 which thereby activates an alarm lamp 45 to provide a visual indication that a failure occurs in the steering control system. The central processing unit 51 also has a self-checking function initiated when at least selected one of the signals fed thereto from the sensors has a state which does not occur during normal vehicle driving. The self-checking operation is terminated when a time has elapsed after the self-checking operation is initiated. The result of the self-checking operation is fed to an indicator drive circuit 48 which drives an indicator 46, which is shown as including four lamps 46a, 46b, 46c and 46d for providing a visual indication of the self-checking result.

Figure 7:
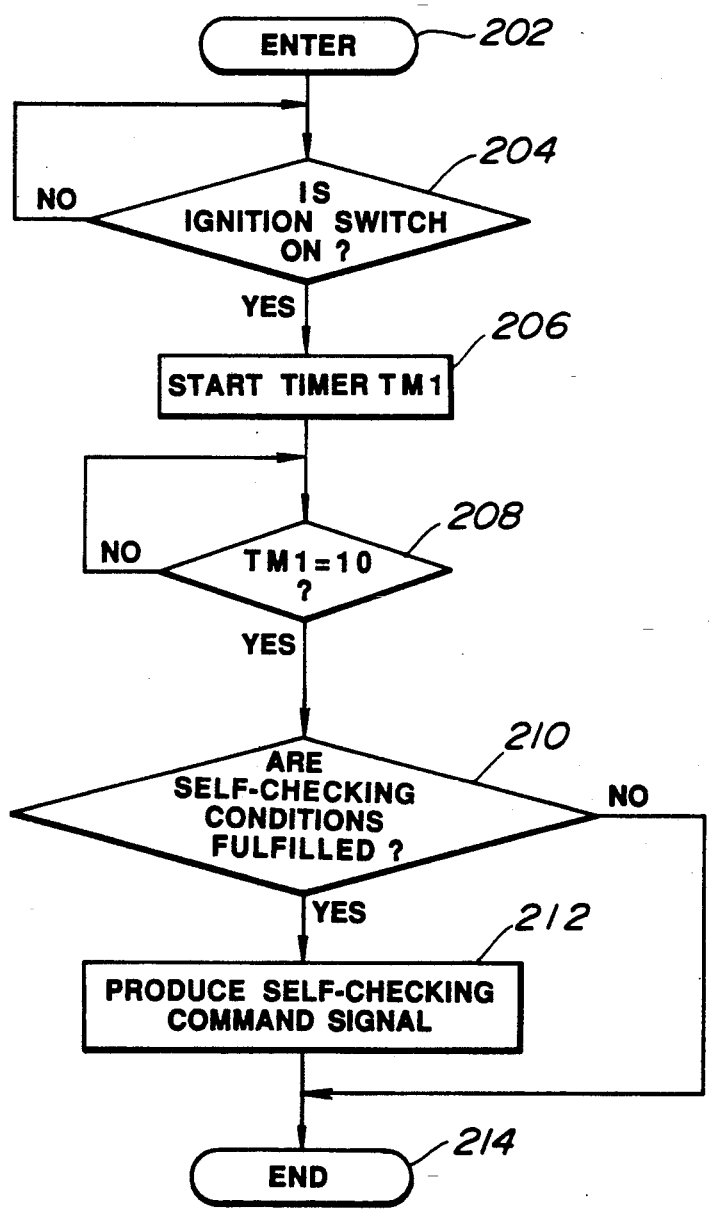
FIG. 7 is a flow diagram showing the programming of the digital computer used in the control unit.

FIG. 7 is a flow diagram illustrating the programming of the digital computer. The computer program is entered at the point 202. At the point 204 in the program, a determination is made as to whether or not the ignition switch 68 is turned on. If the answer to this question is "yes", then the program proceeds to the point 206. Otherwise, the program returns to the point 204.

At the point 206 in the program, the timer TM1 is started. At the point 208 in the program, a determination is made as to whether or nor the timer TM1 is timed out. If the answer to this question is "yes", then it means that a predetermined time (for example, 10 seconds) has elapsed after the ignition switch 68 is turned on and the program proceeds to the point 210. Otherwise, the program returns to the points 208. During the lapse of the predetermined time, the control unit 51 counts the number of times of level changes in the brake switch signal BS fed thereto from the brake switch 70 and the number of times of level changes in the steering wheel neutral position signal CP fed thereto from the steering wheel neutral position sensor 64.

At the point 210 in the program, a determination is made as to whether or not self-checking conditions are fulfilled. The self-checking conditions are fulfilled when the brake switch signal BS changes a predetermined number of times (for example, 10 times) or more in the predetermined time after the ignition switch 68 is turned on and when the steering wheel neutral position signal CP changes a predetermined number of times (for example, 10 times) or more in the predetermined time after the ignition switch 68 is turned on. If the answer to this question is "yes", then it means the control unit 50 receives abnormal signals which do not occur during normal driving and the program proceeds to the point 212 where a self-checking command signal is produced and then to the end point 214. Otherwise, the program proceeds directly to the end point 214.

The self-checking command signal is produced when the self-checking conditions are fulfilled; that is, when the number of times the brake switch signal BS changes exceeds a predetermined value and when the number of times the steering wheel neutral position signal changes exceeds a predetermined value. However, the self-checking conditions are not limited in any way to these conditions as long as the control unit 50 receives a signal having a state which does not occur during normal vehicle driving. Alternatively, the control unit 51 may be arranged to produce the self-checking command signal when the driver operates a switch provided therefor.

Figure 8:
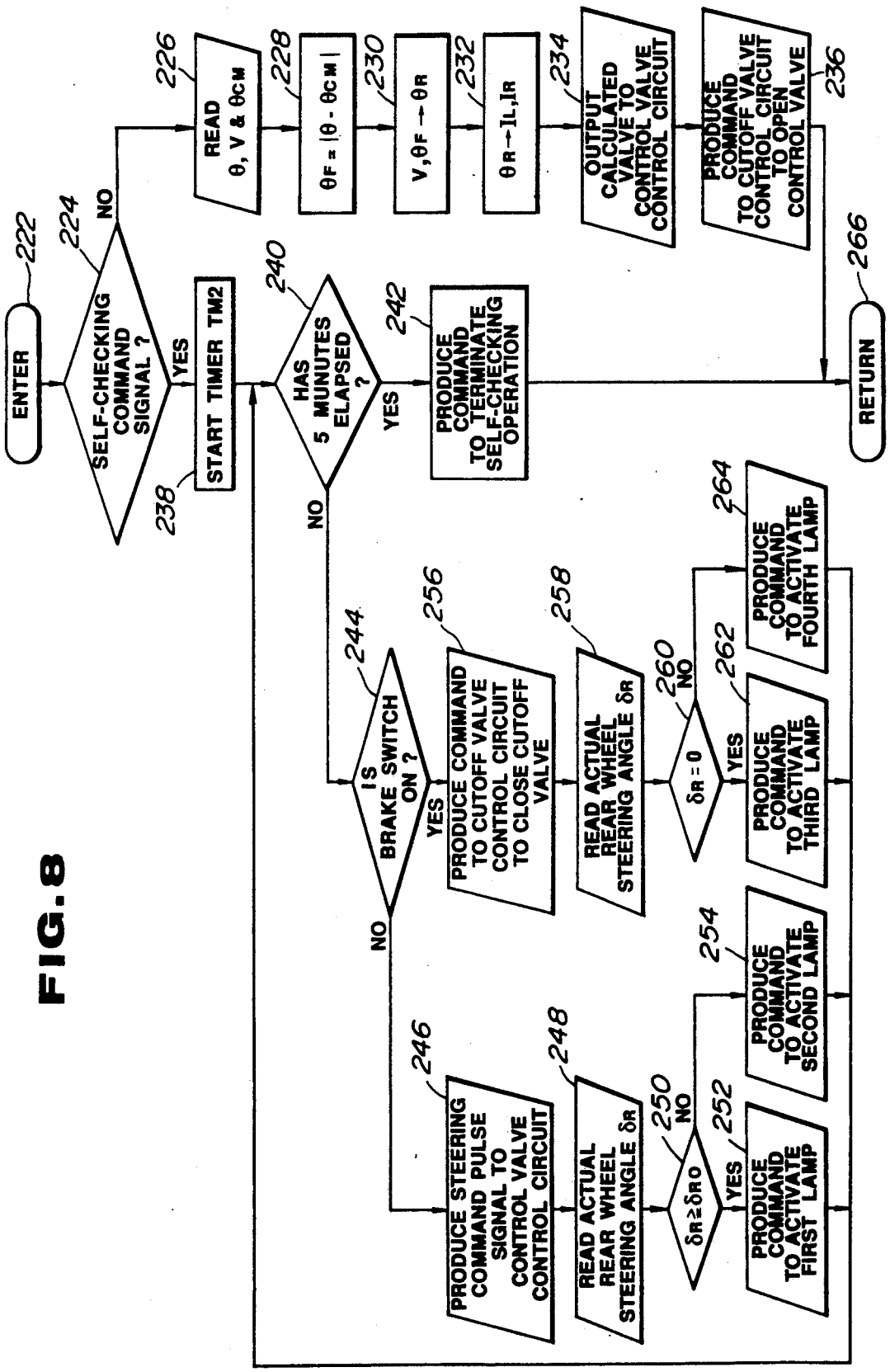
FIG. 8 is a flow diagram showing the programming of the digital computer as it is used for rear wheel sheering control and self-checking operation.

FIG. 8 is a flow diagram illustrating the programming of the digital computer as it is used for the rear wheel steering control along with the self-checking operation. The computer program is entered at the point 222. At the point 224 in the program, a determination is made as to whether or not a self-checking command occurs. The self-checking command is produced at the point 212 of FIG. 7 when the control unit 50 receives abnormal inputs which do not occur during normal driving. If the answer to this question is "no", then the program proceeds to the point 226 where the central processing unit 51 reads the steering wheel position $\theta$, the vehicle speed V, and the estimated steering wheel neutral position $\theta$CM. At the point 228 in the program, the central processing unit 51 calculates a front wheel steering angle $\theta F$ by substracting the estimated steering wheel neutral position $\theta CM$ from the steering wheel position $\theta$. In this case, the front wheel steering angle $\theta F$ is represented as $\theta F=|\theta-\theta CM|$.

At the point 230 in the program, the central processing unit 51 calculates a required value $\theta R$ for rear wheel steering angle based on the read vehicle speed V and the calculated front wheel steering angle $\theta F$. Preferably, the required rear wheel steering angle value $\theta R$ is calculated in a manner to provide a first order advance phase inversion control where the rear wheels 2L and 2R are turned for a moment in the direction opposite to the direction in which the front wheel 1L and 1R are turned and then are turned in the same direction as the front wheel steering direction. When the rear wheels 2L and 2R are turned in the direction opposite to the front wheel steering direction, a cornering force is applied in the yaw direction so as to decrease the time required for the yaw rate to increase to a sufficient value. After a sufficient yaw rate is obtained, the rear wheels 2L and 3R are turned in the same direction as the front wheel steering direction so as to limit the yaw rate increase and thus decrease the sideslip angle. This is effective to increase the steering operation stability and decrease the steering operation response time. This is true particularly at low and intermediate vehicle speeds.

At the point 232 in the program, the central processing unit 51 calculates a value IL or IR for the magnitude of the drive signal IL* or IR* supplied to the solenoid 30L or 30R based on the required rear wheel steering angle $\theta R$ from a relationship programmed into the digital computer. This relationship defines drive signal magnitude as a function of required rear wheel steering angle.

At the point 234 in the program, the calculated drive signal magnitude value IL or IR is transferred to the control valve control circuit 57. The control valve control circuit 57 then sets the control valve 30 by producing a drive signal IL* or IR* to the corresponding solenoid 30L or 30R to cause the steering actuator 20 to turn the rear wheels 2L and 2R at an angle calculated by the computer.

At the point 236 in the program, the central processing unit 51 produces a command to the cutoff valve control circuit 58. The cutoff valve control circuit 58 sets the cutoff valve 25 by producing a drive signal IF to cause the cutoff valve 25 to open. Following this, the program proceeds to the point 266 where the computer program is returned to the entry point 222.

If the answer to the question inputted at the point 224 is "yes", then it means that a self-checking command is produced at the point 212 of FIG. 7 and the program proceeds to the point 238 where the timer TM2 is started. At the point 240 in the program a determination is made as to whether or not the timer TM2 is timed out. If the answer to this question is "yes", it means that a predetermined time (for example, 5 minutes) has elapsed after the self-checking command occurs and the program proceeds to the point 242 where the central processing unit 51 produces a command terminating the self-checking operation and then to the point 266. Otherwise, the program proceeds to the point 244.

Figure 9:
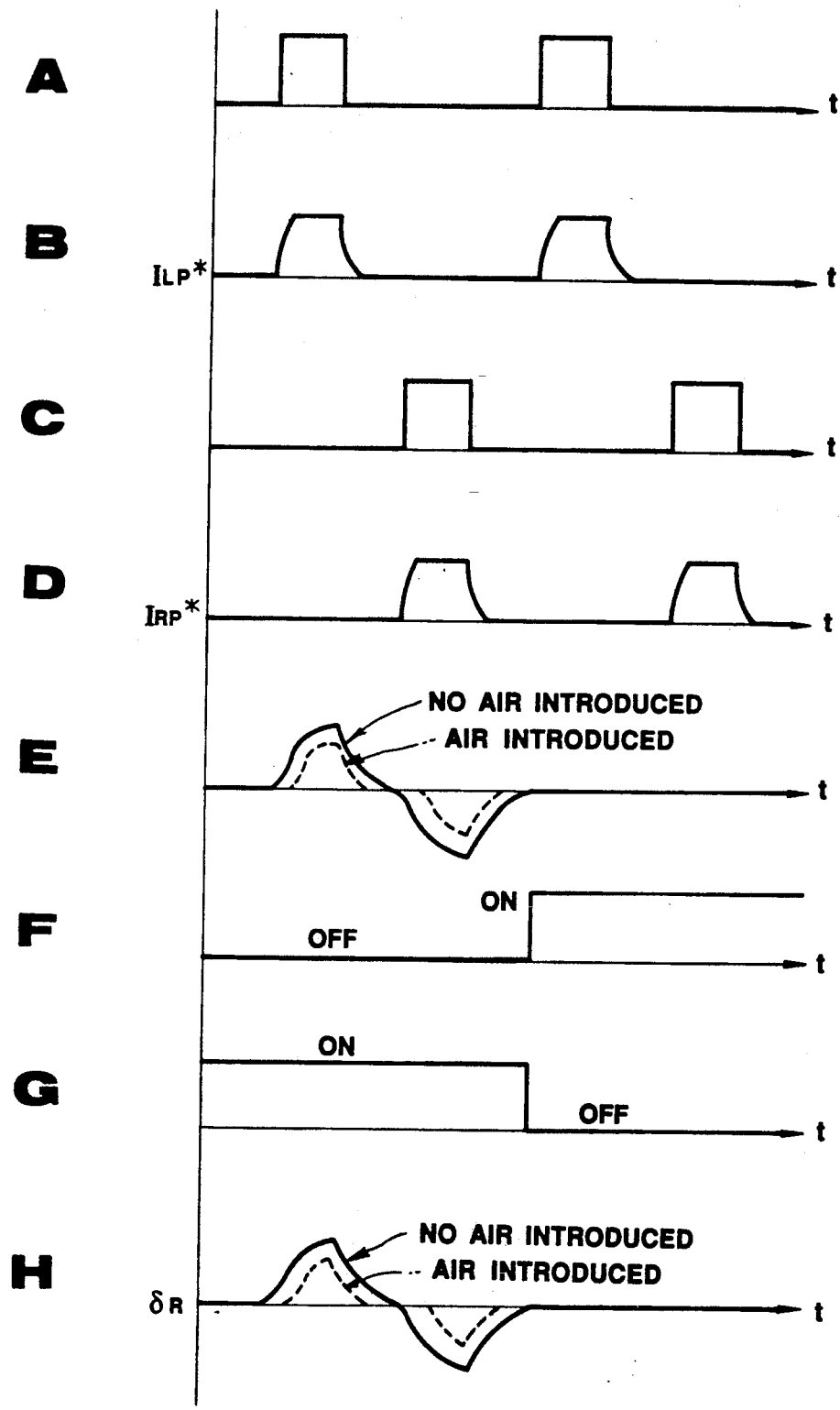
FIG. 9(A-H) is a timing diagram used in explaining the self-checking operation.
Figure 10:
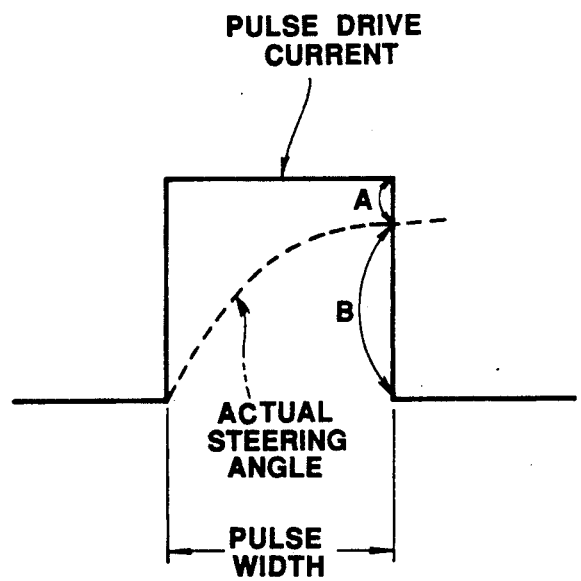
FIG. 10 is a diagram used in explaining the manner in which the pulse width of the drive signals is determined.

At the point 244 in the program, a determination is made as to whether or not the brake switch 70 is turned on. This determination is made based on the brake signal BS fed from the brake switch 70. If the answer to this question is "no", then it means the absence of braking to the vehicle and the program proceeds to the point 246 where first and second steering command pulse signals are produced alternatively. The first steering command pulse signal, shown in FIG. 9A, causes the control valve control circuit 53 to produce a drive pulse signal ILP*, shown in FIG. 9B, to the solenoid 30L of the control valve 30 so as to steer the rear wheels 2L and 2R to the left. Similarly, the second steering command pulse signal, shown in FIG. 9C, causes the control valve control circuit 53 to produce a drive pulse signal IRP*, shown in FIG. 9D, to the solenoid 30R of the control valve 30 so as to steer the rear wheels 2L and 2R to the right. The drive pulse signals ILP* and IEP* have a pulse width (for example 100 msec) insufficient to saturate the step response of the steering actuator 20. This pulse width can produce a detectable difference in the hydraulic pressure charged in the steering actuator 20 between a normal case where no air is introduced into the steering actuator 20 and an abnormal case where air is introduced into the steering actuator 20 to degrade the hydraulic pressure response thereof, as shown in FIG. 9E, and thus a detectable difference in the actual rear wheel steering angle between a normal case where where no air is introduced into the steering actuator 20 and an abnormal case where air is introduced into the steering actuator 20 to degrade the hydraulic pressure response thereof, as shown in FIG. 9H. In FIGS. 9E and 9H, the solid curve relates to a normal case and the broken curve relates to an abnormal case. If the ratio of the distance A to the distance B is 1:9 or less, the actual rear wheel steering angle difference can be detected. If the percentage of the magnitude B with respect to the magnitude (A+B) is greater than 90%, the actual rear wheel steering angle obtained when air is introduced into the steering actuator 20 is too great to detect the actual rear wheel steering angle difference.

At the point 248 in the program, the central processing unit 51 reads the actual rear wheel steering angle R sensed by the rear wheel steering angle sensor 72. At the point 250 in the program, a determination is made as to whether or not the read rear wheel steering angle R is equal to or greater than a predetermined value Ro. If the answer to this question is "yes", then it means that no air is introduced into the steering actuator 20 and the steering actuator 20 has a good hydraulic pressure response and the program proceeds to the point 252 where the central processing unit 51 produces a command causing the indicator drive circuit 48 to activate the lamp 46a to provide a visible indication to the driver that the rear wheel steering control system is in order. Otherwise, the program proceeds to the point 254 where the central processing unit 51 produces a command causing the indicator drive circuit 48 to activated the lamp 46b to provide a visible indication to the driver that the steering actuator 20 has a degraded hydraulic response due to air introduced therein. Following this, the program returns to the point 240.

If the answer to the question inputted at the point 244 is "yes", then the program proceeds to the point 256 where the central processing unit 51 produces a command causing the cutoff value control circuit 58 to interrupt the drive signal IF so as to close the cutoff valve 25, as shown in FIGS. 9F and 9G. At the point 258 in the program, the central processing unit 51 reads the actual rear wheel steering angle R sensed by the rear wheel steering angle sensor 72. At the point 260 in the program, a determination in made as to whether or not the read rear wheel steering angle R is equal to zero at a time when a predetermined time has elapsed after the drive signal IF interrupted. If the answer to this question is "yes", then it means that the cutoff valve 25 operates in order and the program proceeds to the point 262 where the central processing unit 51 produces a command causing the indicator drive circuit 48 to activate the lamp 46c so as to provide a visual indication to the driver that the cutoff valve 25 is in order. Otherwise, the program proceeds to the point 264 where the central processing unit 51 produces a command causing the indicator drive circuit 48 to activate the lamp 46d so as to provide a visual indication to the driver that the cutoff valve 25 is out of order. Following this, the program returns to the point 240.

As can be seen from the flow diagram of FIG. 8, the self-checking operation is terminated a predetermined time (for example, 5 minutes) after a self-checking command signal is produced. This is effective to prevent the temperature of the hydraulic fluid introduced into the steering actuator 20 from increasing to an extent damaging the sealing members used in the steering actuator 20. The self-checking operation may be terminated before the hydraulic fluid temperature increases to an extent damaging the steering actuator 20. For this purpose, a temperature sensor may be provided for sensing the temperature of the hydraulic fluid introduced into the steering actuator 20. In this case, the self-checking operation is terminated before the sensed hydraulic fluid temperature increases to a value above which the sealing members may be damaged. It is to be noted, of course, that the self-checking operation may be terminated before the lapse of the predetermined time or before the sensed hydraulic fluid temperature increases to the value above which the sealing members may be damaged. Furthermore, the self-checking operation may be terminated before a time has elapsed, the time being variable as a function of the sensed hydraulic fluid temperature.

In this embodiment, the control unit 50 terminates the self-checking operation for the rear wheel steering control system and starts the self-checking operation for the cutoff valve 25 upon the application of braking to the vehicle in the course of the self-checking operation made for the rear wheel steering control system.

Although the invention has been described in detail with reference to a preferred embodiment thereof, it should be understood that variations and modifications can be effected within the scope of the invention. For example, the steering actuator 20 may be an electric actuator although it has been shown and described as a hydraulic actuator.

What is claimed is:

1. A vehicle dynamic characteristic control apparatus for use with a motor vehicle having a controllable dynamic characteristic, comprising:
   sensor means sensitive to vehicle running conditions for producing sensor signals indicative of sensed vehicle running conditions;
   actuator means for controlling the dynamic characteristic of the motor vehicle; and
   a control unit coupled between the sensor means and the actuator means, the control unit including means for determining a value for a first setting of the actuator means based on the sensor signals, means for converting the determined value into a second setting of the actuator means, means for producing a start command when braking is applied to said motor vehicle intermittently a predetermined number of times or more in a predetermined period of time, means responsive to the start command for producing an electric signal to operate the actuator means in a self-checking mode, means for producing a termination command when a time has elapsed after the start command is produced, and means responsive to the termination command for terminating the self-checking mode of operation of the actuator means.

2. The vehicle dynamic characteristic control apparatus as claimed in claim 1, wherein the sensor means includes means sensitive to steering handle position for producing a steering handle neutral position signal having a first level when the sensed steering handle position is in a predetermined neutral position range and a second level when the sensed steering handle postion is out of the predetermined neutral position range, and wherein the control unit includes means for producing the start command when the steering wheel neutral position signal changes between the first and second levels a predetermined number of times or more in a predetermined period of time.

3. The vehicle dynamic characteristic control apparatus as claimed in claim 1, wherein the control unit includes means for setting the time at a predetermined value to keep the actuator means from being damaged.

* * * * *